Sept. 24, 1957 S. H. PETRY 2,807,187
TRANSMISSION LIGHT SOURCE
Filed March 4, 1954 2 Sheets-Sheet 1

INVENTOR.
Stanton H. Petry,
BY
Cromwell, Grist & Warden
Attys

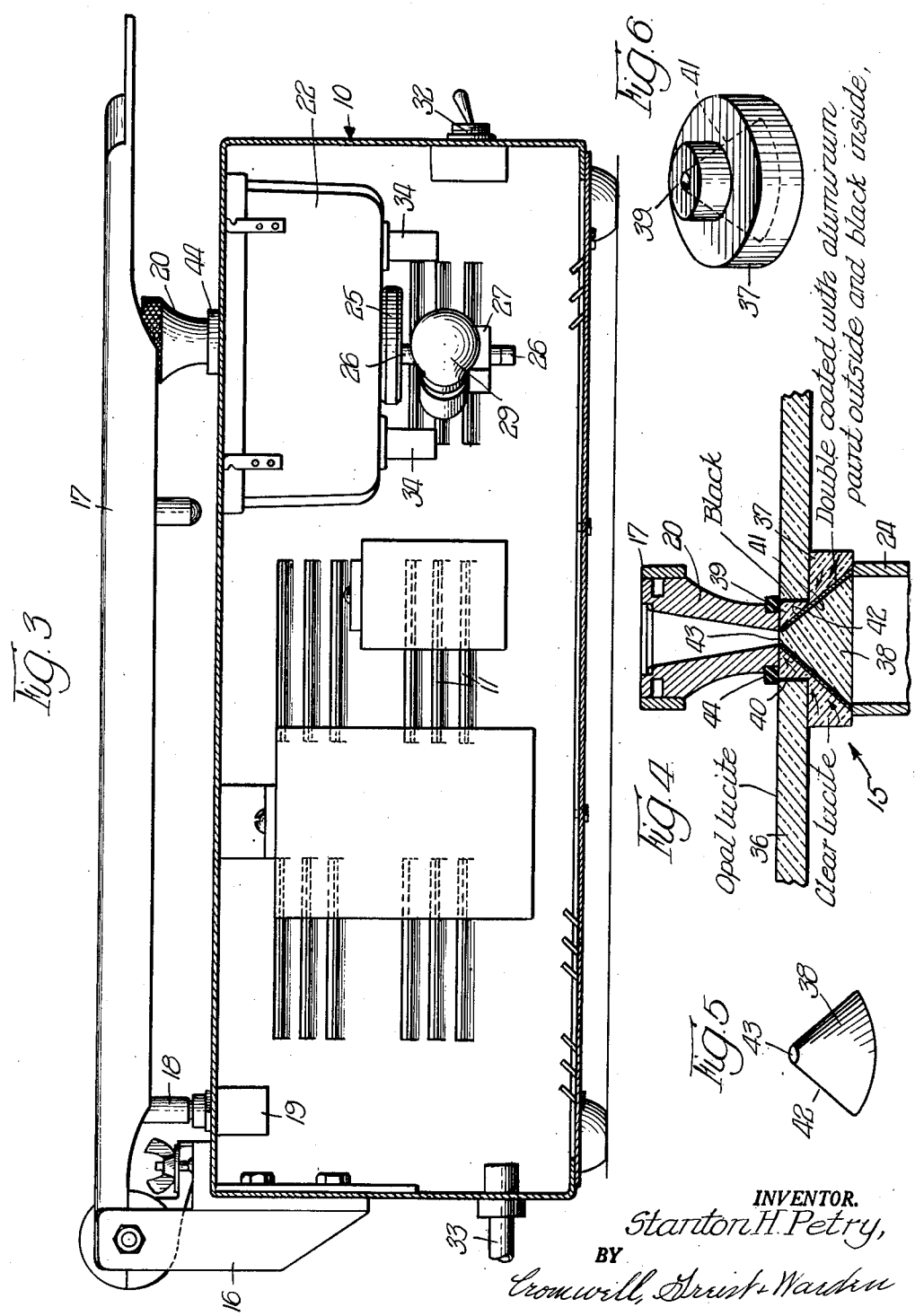

United States Patent Office 2,807,187
Patented Sept. 24, 1957

2,807,187

TRANSMISSION LIGHT SOURCE

Stanton H. Petry, Arlington Heights, Ill., assignor to W. M. Welch Manufacturing Company, Chicago, Ill., a corporation of Illinois Application March 4, 1954, Serial No. 414,031

6 Claims. (Cl. 88—14)

The present invention relates to an improved light source device which has been specially developed for use in observing or reading the so called transmission density of a photographic film, usually in association with a suitable transmission densitometer. As adapted to this type of work, the device enables rapid and accurate readings to be made without straining or fatiguing an operator. With the aid of the improved device the operator can quickly select a spot on a negative or similar film which represents, for example, a tone value at the center of interest of the negative. Thus a densitometer reading at this small local area will give the desired exposure time to result in a most effective print. Flesh tones of the face of a subject are commonly observed for this purpose, but other incremental areas may be availed of; indeed the use of the improved device is not limited to photographic observing or composing work. It is suited to any use in which one may desire to observe directly a transmitted partial image of small area of a light transmissive object, and in which a difficulty of quickly positioning such area in line with a small light beam might ordinarily be expected.

Previous light source devices used in observing light transmittance or density, of a photographic film, for example, have resorted to the use of an opaque support for the film which is provided with a small transparent spot through which light from a suitable radiant source passes. The film is shifted over the support and relative to the aperture in selecting a representative center of interest, at which light is to be transmitted through the film, usually to a densitometer or other light receiver for a reading to guide or time subsequent exposure in printing. Though this sort of device is acceptable in the sense that it affords the desired analysis, it is tedious and fatiguing to use the same since the operator is aided in locating a center of interest of a film solely by a very small bright spot in the middle of a large opaque field beneath the film.

The invention provides an improved transmission light source, for use with a densitometer or related instrument, which overcomes this known disadvantage in present similar units. It does so by providing a comparatively mild illumination of an area, preferably, even, a graduated but still relatively mild illumination of two areas concentrically surrounding an intense light emitting spot, through which the ultimate reading is to be made. Such provision greatly facilitates and expedites manipulation of a film or negative over the entire illuminated area in centering the point of major interest in relation to the light spot. The effect is achieved by providing a primary or center transparent reading spot which is illuminated by a relatively intense light source; a secondary, rather small, annular area directly surrounding the spot, which transmits light of less intensity; and a further annular, disk-shaped zone which provides a relatively large diffusively lighted area surrounding the secondary area, and over which a film may be variably positioned to align its center of interest with the primary spot.

Provisions are also made for the extinguishment of the surrounding or field illumination while a reading is being made. There is also further provision for blocking out stray light at the sides of the reading spot during the reading period.

Stated more specifically, the invention contemplates the provision of a composite illuminating unit to transmit a light field from a light housing. This unit includes a clear Lucite primary cone directly exposed to a source of intense illumination, radiant energy being focused from the source on the apex of the cone, representing a reading spot, through a suitable lens set; a secondary hollow element of clear Lucite having an internal cone surface into which the first cone is nested, this secondary element transmitting a less intense annulus of light from the housing in a relatively small zone immediately surrounding the intense apex spot of the first named cone; and an opalescent Lucite panel surrounding the cone elements and serving to transmit relatively mild diffused light through an area of substantial size framing the primary and secondary illuminated areas.

In still more specific respects, provisions are made in the assembly of the two cone elements to prevent the interference of light passing through the second element with the intensified reading beam directed at the first, also to absorb filament image of the reading beam, should there be image. Further, in order to block out internal and external stray light at the meeting surfaces of the tertiary opalescent panel and secondary cone element, this separation is blackened; it is also externally blocked off or gasketed during the reading phase, in which the light in the housing other than that affording the reading beam is extinguished.

A more general advantage of the invention is that it provides a light source which is completely water tight at its work supporting surface. Using a light panel or unit made up of light transmissive elements of the general character described above, which are sealed in relation to one another, present a continuous upper work surface, and are clamped in liquid-tight relation to a surrounding work table and to a light housing, it follows that wet negatives may be processed in reading and evaluating their density immediately upon removal from a fixing bath, without washing and drying. The time saving thus made possible is a valuable asset in the operation of a photographic developing and printing establishment doing a large volume of work.

The foregoing statements are indicative in a general way of the general nature of the invention. Other and more specific objects will be apparent to those skilled in the art upon a full understanding of the construction and operation of the improved light source.

A single embodiment of the invention is presented herein for purpose of illustration. It will be appreciated that the invention may be incorporated in other modified forms coming equally within the scope of the appended claims.

In the drawings:

Fig. 3 is a view in longitudinal vertical section through the unit;

Fig. 4 is an enlarged fragmentary view in transverse vertical section through the improved triplex light transmission assembly of the device, better showing the special arrangement of component elements of the assembly; and Figs. 5 and 6 are perspective views of two of those components.

Figure 1:
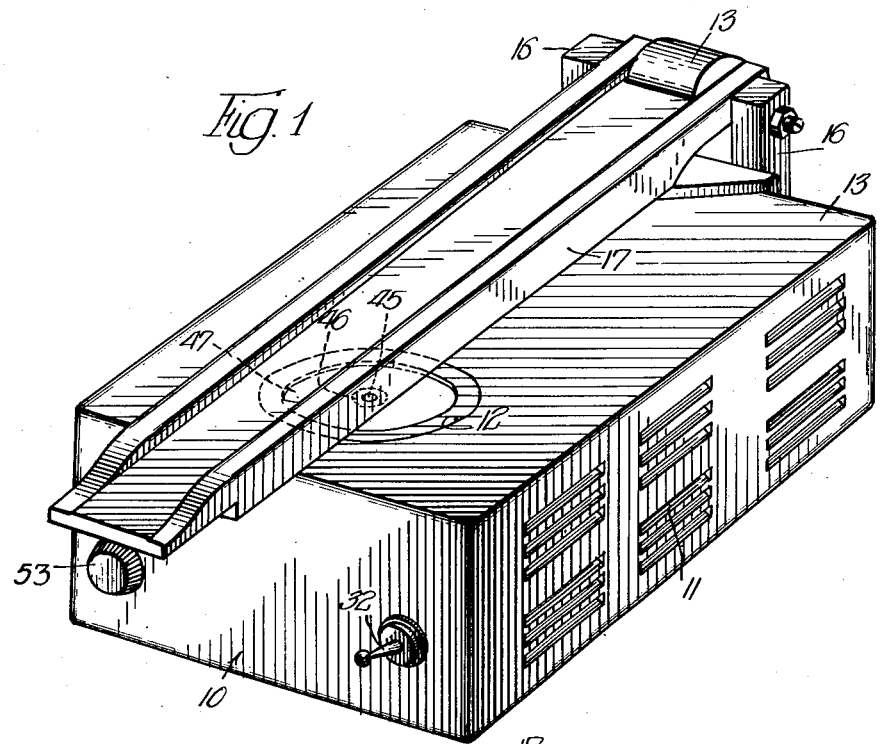
Fig. 1 is a perspective view of the improved light source unit, generally illustrating the relation of its illuminated field provisions to its work supporting surface and adjustable probe arm.
Figure 2:
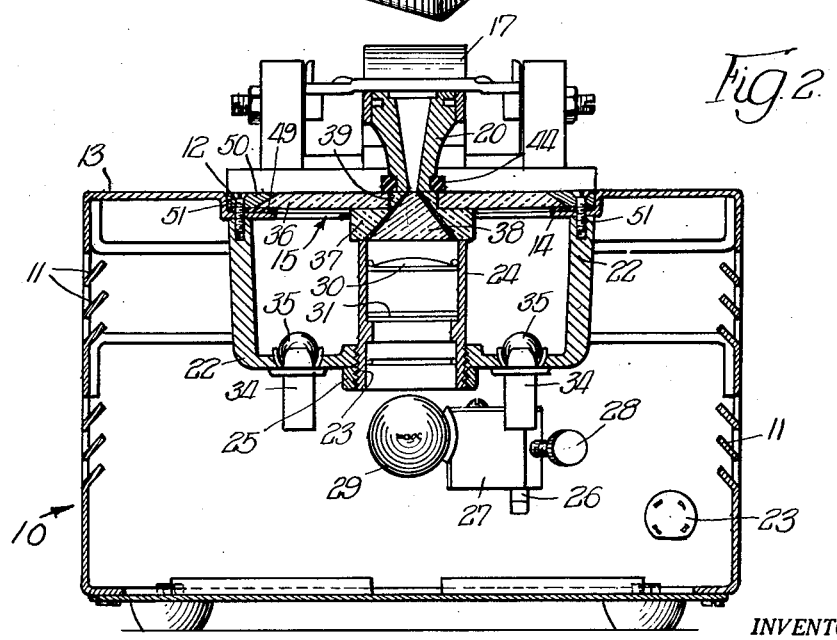
Fig. 2 is a view in transverse section through the unit, in a vertical plane medially of the internal light housing thereof.

First referring to Figs. 1, 2 and 3, the light source device is generally composed of a rectangular, box-like, sheet metal outer casing 10 provided with stamped ventilating louvers 11 at its side and provided with a circular light aperture 12 at a forward midpoint of its flat, work-supporting top plate 13. As illustrated in Fig. 2, the aperture 12 is stamped or otherwise shaped to provide a downwardly positioned annular, radially extending flanged seat 14 for the reception of the improved composite or triplex light transmitting assembly of the invention, a part of a light housing to be described, which assembly is for the present generally designated by the reference numeral 15.

An appropriate fulcrum mount 16 is carried on the rear end of casing 10, on which a forwardly elongated probe arm 17 is pivoted in a known way. Arm 17 is adapted to engage the actuating button 18 of a microswitch 19 (Fig. 3) when fully depressed to the position of Figs. 1, 2 and 3, and switch 19 is appropriately wired to certain low intensity illuminating elements within a light housing of the device, to be described, so as to extinguish those elements when the arm is in the reading position represented in those figures.

The probe arm 17 projects forwardly over the front end of the housing for convenient manipulation by an operator and is provided with a conventional type of receiving cone 20 which is vertically centered with assembly 15 in the position shown and into which passes an intense reading beam after transmission through a photographic film or like object on work surface 13. Suitable provisions, not shown and of no significance in the present invention, convert this transmitted beam photoelectrically for subsequent amplification and utilization, as in a conventional densitometer circuit.

The radially inwardly flanged seat 14 on which assembly 15 is disposed also serves as a support for an opaque, internally reflective lamp housing 22. This may be a suitable aluminum casting of centrally apertured, cup shaped contour, internally coated with flat white lacquer. The housing is secured by screws in depending relation to seat 14 and is threaded at its central aperture 23 for the reception of a vertically disposed, sleeve-like light tube 24. The tube 24 is locked in place after appropriate vertical adjustment by means of a knurled lock nut 25 applied to its lower end.

A vertical rod 26 tapped in the lower surface of housing 22 serves as a support for a lamp socket assembly 27, which is adjustably held on the rod by a set screw 28, and a concentrated filament tungsten lamp 29 is carried directly beneath light tube 24; and a suitable set of condensor lenses, conventionally designated 30, 31, is appropriately mounted in the tube to focus light from lamp 29 upwardly onto and through the transmission assembly 15.

Lamp 29 is controlled by a toggle switch 32 on the front panel of outer casing 10; it is electrically supplied by a suitable cable 33 (Fig. 3) brought into the casing at its rear panel. Light housing 22 also has sockets 34 for three secondary, low wattage lamps 35 mounted in its base. These are preferably automatically controlled by receiver arm 17 in a manner to be described.

The triplex light transmission assembly 15 on seat 14 consists, as best shown in Fig. 4, of a circular field panel 36 of relatively thick opalescent Lucite of, say, four inch diameter and one-quarter inch thickness; a turned hollow element 37 of clear Lucite in a circular cross section, whose interior is shaped as a circular cone; and an internal cone 38 of clear Lucite which is nested upwardly within the internal cone of element 37. These three parts are fixedly associated as a unit and provisions are made to control the transmission of light as between the three thereof.

Referring to Fig. 6, element 37 is formed to provide an upper neck 39 of reduced diameter which is received in a circular aperture of similar diameter in panel 36; and the separation between these circular meeting surfaces is blackened, as at 40, for the purpose of preventing stray light from entering the side of neck 39.

A dual separation is provided between the conical surfaces of the elements 37, 38. The internal cone of the former is coated with aluminum or silver pigment for reflectivity, while the external surface of cone 38 is painted black. Assembly of the two elements is made while the coatings on both are wet, and they are then left to dry. The opaque and reflective coatings are preferably of a water base type, and the elements are cemented together by the same to provide the dual separation referred to above.

There is thus provided an internal opaque surface directly surrounding internal cone 38 which tends to absorb filament image of lamp 29 and to block other light not intended to be focused at the top, relatively small apex spot 43 of the cone; while the external surface of the conical separation is made reflective. In this way illumination from the relatively low power lamps 35 is forwarded with greatest efficiency through a small annular area between the base of reduced neck 39 of element 37 and the internal cone 38. The black separation coating 40 effectively prevents the entry of external light in that zone.

In order to further block out stray external light when a reading is actually being taken, the lowermost extremity of receiving cone 20 on probe or receiver arm 17 is externally grooved for the reception of a compressible sealing gasket 44. This gasket is positioned to engage from above the annular zone representing the blackened separation 40 between panel and elements 36, 37.

Suitable provisions are employed to render the unit liquid-tight, thus enabling it to be used in the rapid processing of wet negatives. As illustrated in Fig. 2, such provisions may take the form of a flat gasket ring 49 applied to the horizontally extending flange seat 14 of stepped aperture 12, against which seat a special bezel ring 50 clamps the panel 36. The bezel and panel are provided with coacting conical surfaces for this purpose. The upper surfaces of the panel and bezel are flush with the top of plate 13, and flat head screws 51 extend through the clamped parts and are threaded into housing 22 to make the assembly.

Thus a light source is provided which is completely water tight, being sealed by gasket 49 beneath bezel 50 and beneath the periphery of the translucent panel 36. There is no light aperture, the surface of the light transmissive unit being in the plane of work surface 13 and continuous throughout. This is important in commercial photographic work since it is often desirable to read and evaluate the density of a negative immediately upon removing the same from the fixing bath and before the washing and drying cycle. The results of the developing process can be observed approximately a half-hour sooner than would otherwise be possible.

A control knob 53 on the front panel of casing 10 may be utilized to govern the intensity of light from lamp 29 through suitable circuit means which, like other electrical provisions, have not been illustrated specifically. These details will be understood by those skilled in the art and, furthermore, do not constitute part of the invention.

In using the viewing device, for example, in scanning a photographic negative to decide on and locate, a center of interest, an operator will observe, as indicated, in Fig. 1, a center reading spot 45 of intense light transmitted from lamp 29, focused by lens set 30, 31 on a clear Lucite center cone 38, an immediately surrounding, small annular area of less intense light transmitted from lamps 35 and directed by reflective coating 42 through an annular zone of element 37 which directly surrounds its cone, and a much larger area 47 of diffused light which contrasts with the appearance of both the transparently transmitted spot 45 and the annulus 46, which are of different intensity as compared with one another.

In the use of the improved device a photographic negative or other object or transparency is quickly and accurately positioned properly in reference to the reading spot 45 with the aid of light transmitted through the less intensely illuminated field areas. In this operation all lamps are illuminated. Probe or receiver arm 17 is now swung downwardly for the actual reading or measurement and its engagement with microswitch actuating button 18 causes secondary lamps 35 to be extinguished. A photoelectric probe circuit may then be completed by provisions not germane to this invention.

The unit is compact and relatively simple and inexpensive to produce. It facilitates a reliable reading of film density, which is quickly arrived at, insofar as speed of selection of a center of interest is concerned, with minimum operator fatigue; and the disturbing effects of undesired stray light are avoided. The unit is also watertight, permitting its safe use with wet negatives in rapid production work, and provides a smooth, flat continuous work surface for the necessary manipulation. The unit is an especially valuable adjunct to a photographic printing establishment conducting a high volume daily business.

Reference has been made to the fact that the illumination emanating from the upper neck 39 of internally conical element 37 is of an intermediate intensity, as compared with the intensities of light through the internal cone 38 and through panel 36. This difference is of course one imposed by the particular mechanical design herein shown; it may be considered of secondary significance, and not necessarily characteristic of all embodiments of the invention.

I claim:

1. An illuminating means for transmission measurements comprising a light housing provided with an internally disposed, upright light transmitting tube, a primary light source positioned to direct a beam through said tube, a secondary light source disposed in said housing externally of said tube, and a light transmission assembly applied to said housing, through which assembly said sources illuminate a work supporting field, said assembly comprising a relatively large field panel of translucent material, an intermediate annular light transmitting element, and a center spot element of transparent material, said field panel and intermediate element being exposed from beneath to said secondary light source and said spot element receiving light from said primary source directed through said tube, upper surfaces of said panel and elements being coplanar to afford a work supporting surface.

2. An illuminating means for transmission measurements comprising a light housing provided with an internally disposed, upright light transmitting tube, a primary light source positioned to direct a beam through said tube, a secondary light source disposed in said housing externally of said tube, and a light transmission assembly applied to said housing, through which assembly said sources illuminate a work supporting field, said assembly comprising a relatively large, centrally apertured field panel of translucent material, an intermediate annular light transmitting element, and a center spot element of transparent material, said field panel and intermediate element being exposed from beneath to said secondary light source and said spot element receiving light from said primary source directed through said tube, upper surfaces of said panel and elements being coplanar to afford a work supporting surface, said intermediate element being received in the central aperture of said field panel.

3. An illuminating means for transmission measurements comprising a light housing provided with an internally disposed, upright light transmitting tube, a primary light source positioned to direct a beam through said tube, a secondary light source disposed in said housing externally of said tube, and a light transmission assembly applied to said housing, through which assembly said sources illuminate a work supporting field, said assembly comprising a relatively large, centrally apertured field panel of translucent material, an intermediate annular light transmitting element, and a center spot element of transparent material, said field panel and intermediate element being exposed from beneath to said secondary light source and said spot element receiving light from said primary source directed through said tube, upper surfaces of said panel and elements being coplanar to afford a work supporting surface, said intermediate element being received in the central aperture of said field panel and having an internal conical surface located in axial alignment with said tube, said spot element being in the form of a cone of transparent material nested into engagement with said internal surface.

4. An illuminating means in accordance with claim 3 in which said field panel is in close encircling relation to an upwardly extending, cylindrical surface of said intermediate element, with an opaque separation between the same, and in which there is a dual separation between the conical surfaces of said intermediate element and said cone, including an opaque coating facing said cone and a reflective coating facing said intermediate element.

5. An illuminating means in accordance with claim 3 in which said field panel is in close encircling relation to an upwardly extending, cylindrical surface of said intermediate element, with an opaque separation between the same, and in which there is a dual separation between the conical surfaces of said intermediate element and said cone, including an opaque coating facing said cone and a reflective coating facing said intermediate element, there being a restricted annular zone of said intermediate element outwardly of said dual separation coatings through which said intermediate element transmits clear light from said secondary light source.

6. An illuminating means for transmission measurements comprising a light housing provided with an internally disposed, upright light transmitting tube, a primary light source positioned to direct a beam through said tube, a secondary light source disposed in said housing externally of said tube, and a light transmission assembly applied to said housing, through which assembly said sources illuminate a work supporting field, said assembly comprising a relatively large, centrally apertured field panel of translucent material, an intermediate annular light transmitting element of transparent material, and a center spot element of transparent material, said field panel and intermediate element being exposed from beneath to said secondary light source and said spot element receiving light from said primary source directed through said tube, upper surfaces of said panel and elements being coplanar to afford a work supporting surface, said intermediate element being received in the central aperture of said field panel, with a light separation between adjacent surfaces thereof, and having an internal conical surface located in axial alignment with said tube, said spot element being in the form of a cone of transparent material nested into engagement with said internal surface, and a tubular light receiving element coacting from above with said light transmission assembly and provided with an annular compressible sealing gasket in vertical alignment with and engaging said light separation in the operative position of said receiving element.

References Cited in the file of this patent

UNITED STATES PATENTS

| | | |
|---|---|---|
| 2,235,590 | Rockwell | Mar. 18, 1941 |
| 2,437,411 | Tuttle | Mar. 9, 1948 |